US00RE34723E

United States Patent [19]

Robinson et al.

[11] E Patent Number: Re. 34,723

[45] Reissued Date of Patent: Sep. 13, 1994

[54] KNITTING METHOD FOR FORMING INTEGRALLY FORMED JOINS FOR THREE DIMENSION FABRIC

[75] Inventors: Frank Robinson; Gerald F. Day, both of Breaston, United Kingdom

[73] Assignee: General Motors Corporation, Detroit, Mich.

[21] Appl. No.: 84,490

[22] Filed: Jun. 29, 1993

Related U.S. Patent Documents

Reissue of:

[64] Patent No.: 5,038,585
Issued: Aug. 13, 1991
Appl. No.: 412,139
Filed: Sep. 25, 1989

[30] Foreign Application Priority Data

Sep. 27, 1988 [GB] United Kingdom ..... 8822639.4

[51] Int. Cl.[5] ..... D04B 1/22
[52] U.S. Cl. ..... 66/170
[58] Field of Search ..... 66/170, 171, 173, 174, 66/189, 196

[56] References Cited

U.S. PATENT DOCUMENTS

| | | | |
|---|---|---|---|
| 1,434,941 | 11/1922 | Boyd | 66/178 R |
| 2,268,818 | 1/1942 | Goodman | 66/172 |
| 3,143,870 | 8/1964 | Smith | 66/170 |
| 3,802,229 | 4/1974 | Fregeolle | 66/177 |
| 3,807,200 | 4/1974 | Liwski | 66/170 |
| 3,937,040 | 2/1976 | Negri | 66/177 |
| 4,070,874 | 1/1978 | Zouhar et al. | 66/177 |
| 4,100,769 | 7/1978 | Nurk | 66/177 |
| 4,660,888 | 4/1987 | Urai | 66/171 X |

FOREIGN PATENT DOCUMENTS

| | | | |
|---|---|---|---|
| 1060722 | 12/1983 | U.S.S.R. | 66/170 |

OTHER PUBLICATIONS

Knit-to-Shape and Full-Fashioned Knitting Procedures—Offerman, Tausch-Marton, and Haupt, Knitting Times, Apr. 12, 1973, pp. 47-55, vol. 40, No. 15.

*Primary Examiner*—Clifford D. Crowder
*Assistant Examiner*—John J. Calvert
*Attorney, Agent, or Firm*—Davis Hoxie Faithfull & Hapgood

[57] ABSTRACT

Knitted joins are made in double jersey knitted articles using a method which minimizes the effect of hole formation at the join. Single jersey edges are knitted along the edges to be jointed, being knitted on from one to six needles in each of the courses of knitting which form part of the edge of the join. The edgings need not extend along the whole length of the join. In a further embodiment superimposed strips of single jersey knitting are knitted between the edgings so as to split hole formation into two smaller series which are less noticeable. With this embodiment, one or both edgings can be omitted. The method is useful for upholstery fabric joins, particular for vehicle seat covers, where exposure of the padding is to be avoided.

19 Claims, 2 Drawing Sheets

KNITTING METHOD FOR FORMING INTEGRALLY FORMED JOINS FOR THREE DIMENSION FABRIC

Matter enclosed in heavy brackets [ ] appears in the original patent but forms no part of this reissue specification; matter printed in italics indicates the additions made by reissue.

BACKGROUND OF THE INVENTION this invention relates to a method of knitting, on a knitting machine having independently operable needles disposed in at least two needle beds, for example a flat V-bed machine, an article having a mainly double jersey structure and which comprises two areas having respective edges which are joined together on the machine, during the knitting of the article, so that wales on opposite sides of the join between said edges are inclined to one another. Such an article will be referred to herinafter as "an article of the kind referred to".

FIGS. 1 and 2 of the accompanying drawings are plans illustrating a conventional way of producing an article of the kind referred to on a flat V-bed knitting machine, FIG. 1 being a purely schematic diagram to illustrate the knitting procedure, and FIG. 2 being a diagram of the knitted article.

In order to produce the article shown in FIG. 2, a piece 1 of fabric, see FIG. 1, is first knitted with courses of equal length to form a rectangular fabric extending from a starting course 2 to a course 3. Needles of the machine are then progressively rendered inactive in the direction from left to right, as viewed in FIG. 1, so that as knitting continues, in the direction of the arrow A, shorter and shorter courses are produced to form a piece 4 of fabric of trapezoidal shape extending from course 3 to course 5. As each needle is rendered inactive it retains the last loop it knitted. When course 5 has been knitted, progressive re-activation of the inactive needles is performed during the knitting of a further piece 6 of fabric between courses 5 and 7, the piece 6 also being of trapezoidal shape. As the fabric piece 6 is being knitted, the edges designated 8 and 9 in FIG. 1 are automatically joined, this joining being indicated schematically by the chain lines 10 in FIG. 1. When all the previously inactivated needles have been re-activated, upon completion of course 7, knitting continues with courses of equal length to produce a further piece 11 of fabric of rectangular shape extending from course 7 to a final course 12. The final appearance of the article is as shown in FIG. 2. It will be appreciated that the knitted wales extending between courses 2 and 5 are inclined to the knitted wales extending between courses 5 and 12.

Knitted joins of the kind described above are frequently used in the production of knitted garments. For example, the article shown in FIG. 2 may form part of the shoulder region of a cardigan, where the fabric piece 1 forms part of a body panel of the cardigan and the fabric piece 11 forms part of a sleeve of the cardigan. By joining the two fabric pieces, on the machine, at the edges 8 and 9, the sleeve part of the cardigan is automatically inclined to the body panel as the knitting proceeds.

In the production of the article shown in FIG. 2, the edges 8 and 9 are not exactly straight owing to the step-wise inactivation and subsequent step-wise re-activation of needles of the machine. Instead, the edges 8 and 9 have a stepped configuration, as shown in FIG. 3 of the accompanying drawings, which is a schematic view, on an enlarged scale, of part of the join between the edges 8 and 9 of the article of FIG. 2. From FIG. 3 it will be seen that the joining of the two edges 8 and 9 results in the formation of a series of holes 13 in the fabric along the join. The area of these holes will be the larger the greater the angles R and S (in FIG. 1) are chosen. Generally speaking, the existence of these holes 13 becomes apparent when either of the angles R and S exceeds 45 degrees.

In FIG. 1 the edges 8 and 9 are approximately straight. In some knitted articles the edges 8 and 9 may have a generally convex or concave curvature, as shown in FIG. 4 of the accompanying drawings, which is a diagram similar to FIG. 1 relating to a modified form of the article of FIG. 2. The problem of hole formation when the curved edges 8a and 9a, in FIG. 4, are joined again begins to become apparent when either of the angles R and S exceeds 45 degrees. In this case the angles R and S denote the inclination to the knitting line X—X of tangents to the curved edges 8a and 9a at points such as G and H on these two edges which are joined to one another in the finished article. Clearly, unlike the situation in FIG. 1, the angles R and S have different values at different points along the edges 8a and 9a. Therefore, when the edges 8a and 9a are joined during the knitting procedure, the formation of holes along the join may not be apparent when the angles R and S are less than 45 degrees (for example in the regions FG and FH of the edges 8a and 9a), but will become increasingly apparent, in the direction from right to left, as viewed in FIG. 4. as the angles R and S exceed 45 degrees (for example in the regions GB and HD of the edges 8a and 9a).

In some knitted articles the appearance of the holes 13 along a join line may not be objectionable and, indeed, may be desirable, for example to produce a decorative effect in the join between a sleeve part and a body panel of a cardigan. However, in other articles, such a series of holes along a join may be objectionable. For example, in the case of knitted upholstery fabric, the presence of a series of holes along a join may reveal the presence of underlying structure, such as padding material, which spoils the appearance of the fabric.

Referring to FIG. 1, it will be appreciated that the edge 8 is knitted along a needle bed length equal to the distance BC. Likewise, the edge 9 is knitted along a needle bed length equal to the distance DE. However, when the edges 8 and 9 are joined the stitches of edge 8 extend through the distance BF and the stitches of edge 9 extend through the length DF. Since BF is greater than BC and DF is greater than DE, this means that the knitted fabric is stretched slightly along the join between the edges 8 and 9. This stretching is accommodated by the elastic nature of the fabric.

The present invention aims to provide a method of knitting, on a knitting machine having independently operable needles disposed in at least two needle beds, an article of the kind referred to in which steps are taken to render less apparent the above-described holes along said joint of the article. The invention also includes an article knitted by the method.

SUMMARY OF THE INVENTION

According to the invention, a method of knitting, on a knitting machine having independently operable needles disposed in at least two needle beds, an article of the kind referred to, is characterised by the steps of knitting a single jersey edging along at least part of the length of, and integrally with, each of said edges, each of said edging being knitted on from one to six needles in each of the courses of knitting which form said at least part of the length of each of said edges, and joining adjacent edges of said edgings, during the knitting of the article, to form the join between said areas of the article.

Preferably, each of the single jersey edgings is knitted on two needles in each of the courses of knitting which form said at least part of the length of each of said edges.

In one embodiment of the method according to the invention the adjacent edges of the two single jersey edgings are joined directly to one another. In this case, any holes formed along the join between said areas will occur in the single jersey edgings. These single jersey edgings are less elastic than the main double jersey structure of the article, so that as said areas are stretched, in the region of the join formed therebetween, the single jersey edgings are less easily stretched than the double jersey fabric to which they are attached. The result of this is that the loops in the single jersey edgings are tightened and thus become smaller than the loops in the adjacent double jersey structure. The effect of this is to reduce the size of any holes formed along the join between the single jersey edgings.

In a second embodiment of the method according to the invention, from one to four courses of single jersey knitting are formed on two of said needle beds to form two superimposed strips of single jersey knitting between the single jersey edgings along at least part of the length of the latter, so that in the finished article the single jersey edgings are joined to one another, along at least part of the length, via *one of* these two superimposed strips of single jersey knitting. This has the effect of forming two series of holes along the join between said areas of the article, one series adjacent to the first, and the other series adjacent to the last, of the courses in each of the two superimposed strips of single jersey knitting. These holes, however, will only be half the size they would have been if the superimposed strips of single jersey knitting had not been provided. The presence of these smaller holes is much more difficult to detect.

With this second embodiment of the method according to the invention, it is also possible to omit the knitting of at least one of the single jersey edgings. Where and edging is omitted, then during the knitting of the article, the two superimposed strips of single jersey knitting are joined directly to the adjacent edge of the area of double jersey knitting and, where an edging is present, [they are jointed] *one of the strips is joined* to the edging. In this variation of the second embodiment, it is preferred that an edging is knitted on that edge of the area of double jersey knitting which is knitted later in the knitting sequence, i.e. edge 9 shown in FIG. 5 of the accompanying drawings.

In this second embodiment of the method according to the invention, it is found that if, after knitting of the article has been completed, the join between said areas of the article is temporarily stretched, for example manually, in the direction along the join, the width (in the wale direction) of the superimposed strips of single jersey knitting can be caused to decrease. This has the effect of drawing the single jersey edgings closer to one another and deflecting them slightly out of the plane of the fabric adjacent to the join. This deflection of the single jersey edgings has the effect of making any holes along the join appear to be smaller, when viewed in a direction normal to the fabric areas adjacent to the join. Furthermore, the deflected edgings give the join the appearance of a seam, which in some cases may enhance the appearance of the finished article.

Preferably, in this second embodiment of the method according to the invention and its variation, each of the two superimposed strips of single jersey knitting comprises two courses.

The method according to the invention may be employed in the knitting of articles of the kind referred to having any known structure of mainly double jersey kind, for example any rib structure, or a two colour Jacquard fabric with a bird's eye backing. The single jersey edgings may comprise all knitted stitches or may comprise knitted stitches and tuck stitches, for example alternating, and, in the case when an edging comprises a single course, may comprise all tuck stitches. The single jersey edgings are preferably of the same knitted construction as each other but may be of different construction.

The strips of superimposed single jersey knitting formed in the second embodiment of the invention and its variation, may comprised all knitted stitches or may comprise knitted stitches and tuck stitches. The latter provide a reserve of yarn which helps the strips to accommodate in length to the greater length of the finished join, particularly on wide-angle joins.

Preferably, the single jersey edgings, and one or both of the two superimposed strips of single jersey knitting, when provided, are knitted using the same yarn, or one of the same yarns, employed to knit the main double jersey areas of the article. It is, of course, possible to use other yarns for these edgings and/or superimposed strips of single jersey knitting, but it will then be necessary to supply such other yarn or yarns from one or more additional yarn carriers on the knitting machine. When said superimposed strips of single jersey knitting are provided, there may be advantage in knitting one or both of them with a special effect yarn, for example elastomeric yarn, high bulk yarn or latent crimp yarn. The use of such special effect yarns make it still more difficult to see holes along the join between said areas of the article.

The method of the invention is of particular benefit for joining the double jersey edges which, if left unjoined, would meet at an angle of greater than 90 degrees, or in the case of convexly-opposed curved edges would have tangents to those curves which meet at an angle of greater than 90 degrees.

The invention includes a knitted article comprising a join produced by the method according to the invention. In particular, it includes an upholstery cover, for example a seat cover for the seat base or seat back of a vehicle seat, which is shaped to fit a three-dimensional support which it is to cover by a method which includes the knitting of joins by the method according to the invention.

BRIEF DESCRIPTION OF THE DRAWINGS

The invention will now be described in greater detail, by way of example, with reference to FIGS. 5 and 6 of the accompanying drawings, in which:

In FIG. 5 the same reference numerals and letters have been used as in FIG. 1 to designate the same or similar features.

DESCRIPTION OF PREFERRED EMBODIMENT

Figure 1:
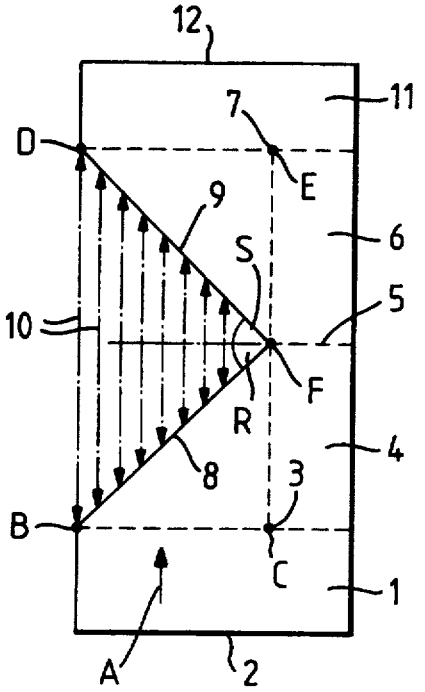
FIG. 1 is a schematic diagram illustrating a conventional way of producing an article having a mainly double jersey structure and comprising two area having edges joined together on a knitting machine during knitting of the article so that wales on opposite sides of the join between the edges are inclined to one another.
Figure 5:
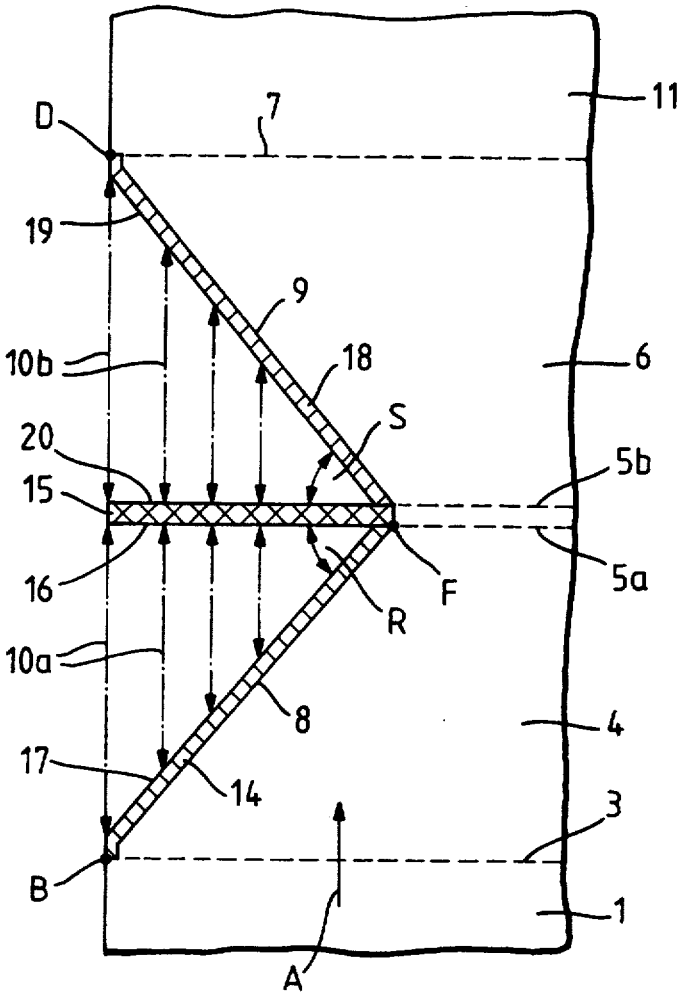
FIG. 5 is a schematic diagram, similar to FIG. 1, illustrating the knitting procedure used in an embodiment of the method according to the invention.

Referring to FIG. 5, double jersey fabric is knitted on a flat V-bed knitting machine in the same way as described with reference to FIG. 1 up to the course 3. The knitting is then narrowed, by making needles progressively inactive, to produce the edge 8 which terminates at course 5a. During this procedure the needles made inactive retain their last knitted loops. Also during this procedure an edging 14 of single jersey fabric is knitted on one needle bed of the machine, this edging being integral with the fabric piece 4 along the edge 8 and being knitted on two needles in each course from course 3 to course 5a.

Upon completion of course 5a, all the inactive needles are brought back into action and two courses of single jersey knitting are knitted on each of the opposed needle beds, up to course 5b, to form two superimposed strips 15 of single jersey knitting. These strips of single jersey knitting have the same length as course 3 and during the knitting thereof [each of the strips 15] *one of the strips 15 (the lower strip 15 shown in FIG. 6) is joined along its edge 16, as indicated by the chain lines 10a, to the edge 17 of the single jersey edging 14. The other strip 15 (the upper strip 15 shown in FIG. 6) is joined directly to edge 8 of fabric piece 4.*

Upon completion of the course 5b, the needles which were brought back into action upon completion of course 5a are again made inactive while retaining their last knitted loops. The fabric piece 6 is then knitted in double jersey structure by progressively re-activating needles in the direction from right to left, as viewed in FIG. 5, to form the edge 9. At the left-hand end of each of the courses from course 5b to course 7 single jersey fabric is knitted on two needles of one bed of the machine to produce an edging 18 of single jersey fabric, this edging being integral with the fabric piece 6 along the edge 9. As needles are progressively re-activated, the edge 19 of the single jersey edging 18 is joined to the edge 20 of [each of the strips 15] *one of the strips 15 (the lower strip shown in FIG. 6)*, as indicated by the chain line 10b. *The other strip 15 (the upper strip 15 shown in FIG. 6) is joined directly to edge 9 of the fabric piece 6.*

Figure 2:
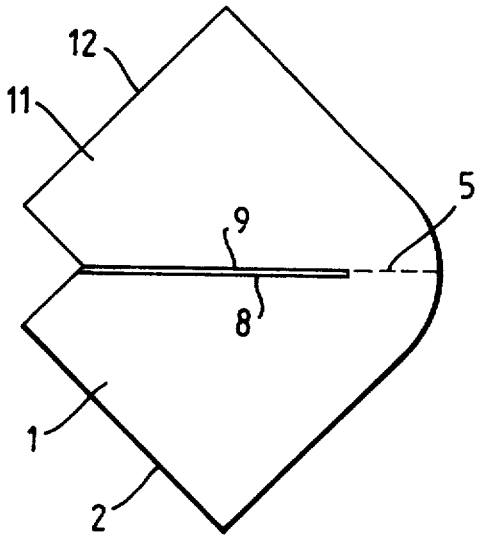
FIG. 2 is a diagram of the knitted article made by the conventional procedure of FIG. 1.
Figure 3:
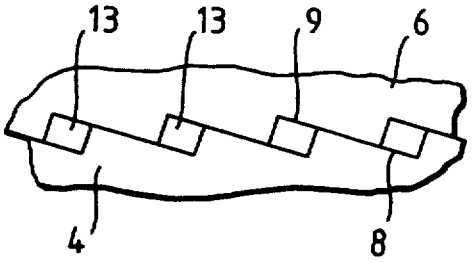
FIG. 3 is a schematic view on an enlarged scale of a part of the join between the edges of the article of FIG. 2.

When all the previously inactivated needles have been reactivated, at the course 7, knitting continues to form the fabric piece 11, in the same way as described with reference to FIG. 1. The completed article has much the same shape as the article shown in FIG. 2.

Figure 6:
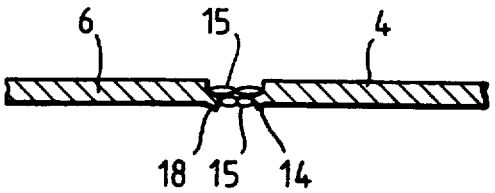
FIG. 6 is a sectional view, on an enlarged scale, through the join region of the article of FIG. 5.

After removal of the finished article from the knitting machine, the fabric in the region of the join is manually stretched along the line of the join and, as previously described, this has the effect of drawing the edgings 14 and 18 closer together and deflecting them slightly out of the plane of the adjacent fabric, as indicated schematically in FIG. 6. It is virtually impossible to see holes in the join of the article of FIGS. 5 and 6 for values of the angles R and S considerably in excess of 45 degrees. In fact very satisfactory results have been obtained in cases where R+S=130 degrees, R and S having the same or different values.

Generally speaking, it is only necessary to provide the strips 15 when R+S exceeds 90 degrees. In articles in which R+S lies between 45 and 90 degrees it is usually sufficient to omit the strips 15 and join the edgings 14 and 18 directly to one another.

Figure 4:
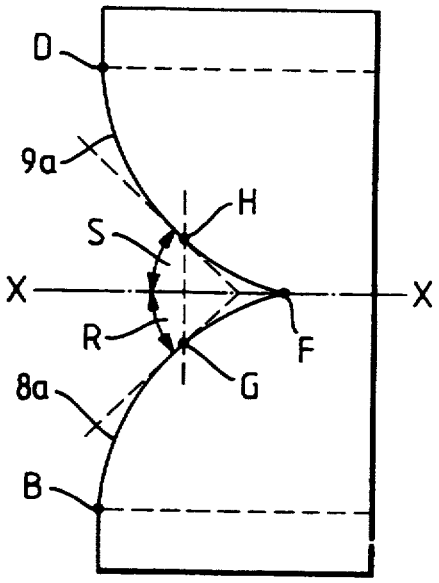
FIG. 4 is a schematic diagram view of FIG. 1 of a conventional procedure for making a modified form of the article of FIG. 2.

It is not always necessary for the strips 15 and/or the edgings 14 and 18 to extend right up to the point F. Especially in the case of articles in which the edges 8 and 9 are convexly curved (as in the article of FIG. 4), it may only be necessary for the edgings 14 and 18 to extend part of the way from the points B and D, respectively, towards the point F. If the strips 15 are provided, they also may only need to extend part of the way from the line BD towards the points F.

it will be appreciated that the article shown in FIGS. 5 and 6 is a very simple example chosen to illustrate the method according to the invention. In practice, the method according to the invention will normally be used in the knitting of more complicated articles, for example in the formation of joins in knitted covers for upholstery purposes.

What is claimed is:

1. In a method of knitting, on a knitting machine having independently operable needles disposed in at least two needle beds, an article having a mainly double jersey structure comprising two areas having respective edges joined together on the machine, during the knitting of the article, so that wales on opposite sides of a join between said edges are inclined to one another, the improvement comprising knitting a single jersey edging along at least part of a length of, and integrally with, each of said edges, each of said edgings being knitted on two needles in each course of knitting which forms said at least part of the length of each of said edges, and joining adjacent edges of said edgings, during the knitting of the article, to form the join between said areas of the article.

2. A method according to claim 1 wherein from one to four courses of single jersey knitting are knitted on each of two of said needle beds to form two superimposed strips of single jersey knitting between said single jersey edgings along at least part of the length of said edgings so that in a finished article the single jersey edgings are joined one to another, along at least part of their lengths, via *one of* said two superimposed strips of single jersey knitting.

3. A method according to claim 2 wherein the knitting of at least one of said single jersey edgings is omitted and, during the knitting of the article, the two superimposed strips of single jersey knitting are joined, where said edging is omitted, directly to an adjacent edge of an area of double jersey knitting and, where an edging is present, *one of them is joined* to said edging.

4. A method according to claim 3 wherein a single jersey edging is knitted on the edge of said double jersey are knitted later in the knitting sequence.

5. A method according to claim 2 wherein each of the two superimposed strips of single jersey knitting comprises two courses.

6. A method according to claim 1 wherein the single jersey edgings and at least one of two superimposed strips of single jersey knitting are knitted with a same yarn, or one of the same yarns, as is used for knitting the main double jersey structure of the article.

7. A method according to claim 2 including the subsequent step of temporarily stretching the join region of the article in the direction of the join.

8. A method according to claim 2 wherein at least one of the superimposed strips of single jersey knitting is knitted with a yarn selected from an elastomeric yarn, a high bulk yarn and a latent crimp yarn.

9. A method according to claim 1 wherein the edges of the double jersey areas to be joined are knitted so that, if left unjoined, said edges, or tangents of said edges in the case of convexly-opposed curved edges, would meet at an angle of greater than 90 degrees.

10. A knitted article having a mainly double jersey construction comprising two areas having respective edges which are joined together so that wales on opposite sides of the join between said edges are inclined to one another wherein the join is produced by the method claimed in claim 1.

11. An upholstery cover comprising knitted fabric of mainly double jersey construction shaped to fit a three dimensional support, said cover having joins wherein the cover is made by a method which includes the knitting of said joins by the method claimed in claim 1.

12. In a method of knitting, on a knitting machine having independently operable needles disposed in at least two needle beds an article having a mainly double jersey construction comprising two areas having respective edges joined together on the machine, during the knitting of the article, so that wales on opposite sides of a join between said edges are inclined to one another, the features of knitting said edges so that, if the edges were left unjoined, said edges, or tangents to said edges in the case of convexly-opposed curved edges, would meet at an angle of greater than 90 degrees, and knitting a single jersey edging along at least part of a length of, and integrally with, each of said edges, each of said edges being knitted on from one to six needles in each course of knitting which forms said st least part of the length of each of said edges and joining adjacent edges of said edgings during the knitting of the article to form the join between said areas of the article.

13. An upholstery cover comprising knitted fabric of mainly double jersey construction shaped to fit a three dimensional support and having joins, wherein the cover is made by a method which includes the knitting of said joins by the method claimed in claim 12.

14. In a method of knitting, on a knitting machine having independently operable needles disposed in at least two needle beds, an article having a mainly double jersey structure comprising two areas having respective edges joined together on the machine, during the knitting of the article, so that wales on opposite sides of a join between said edges are inclined to one another, the improvement of knitting a single jersey edging along at least part of a length of, and integrally with, each of said edges, each of said edgings being knitted on from one to six needles in each course of knitting which forms said at least part of the length of each of said edges, and in addition knitting from one to four courses of single jersey knitting on each of two of said needle beds to from two superimposed strips of single jersey knitting between said single jersey edgings along at least part of the length of said edgings so that in a finished article the single jersey edgings are joined one to anther, along at least part of their lengths, via *one of* said two superimposed strips of single jersey knitting to form the join between said areas of the article.

15. A method according to claim 14 wherein the knitting of at least one of said single jersey edgings is omitted and, during the knitting of the article, the two superimposed strips of single jersey knitting are joined, where said edging is omitted, directly to an adjacent edge of an area of double jersey knitting and, where an edging is present, *one of them is joined* to said edging.

16. In a method of knitting, on a knitting machine having independently operable needles disposed in at least two needle beds, an article having a mainly double jersey structure comprising two areas having respective edges joined together on the machine, during the knitting of the article, so that wales on opposite sides of a join between said edges are inclined to one another, the improvement of knitting a single jersey edging along at least part of a length of, and integrally with, each of said edges, each of said edgings being knitted on from one to six needles in each course of knitting which forms said at least part of the length of each of said edges, and joining adjacent edges of said edgings, during the knitting of the article, to form the join between said areas of the article.

17. In a method of knitting, on a knitting machine having independently operable needles disposed in at least two needle beds, an article having a mainly double jersey structure comprising two areas having respective edges joined together on the machine, during the knitting of the article, so that wales on opposite sides of a join between said edges are inclined to one another, the improvement of knitting a single jersey edging along at least part of a length of, and integrally with, each of said edges, each of said edgings being knitted on from one to two needles in each course of knitting which forms said at least part of the length of each of said edges, and joining adjacent edges of said edgings, during the knitting of the article, to form the join between said areas of the article.

18. In a method of knitting, on a knitting machine having independently operable needles disposed in at least two needle beds, an article having a mainly double jersey structure comprising two areas having respective edges joined together on the machine, during the knitting of the article, so that wales on opposite sides of a join between said edges are inclined to one another, the improvement of knitting a single jersey edging along at least part of a length of, and integrally with, each of said edges, each of said edgings being knitted on from three to six needles in each course of knitting which forms said at least part of the length of each of said edges, and joining adjacent edges of said edgings, during the knitting of the article, to form the join between said areas of the article.

19. An upholstery cover comprising knitted fabric of mainly double jersey construction shaped to fit a three-dimensional support and having joins formed between two areas of fabric having respective edges joined to form the join so that wales on opposite sides of the join between said edges are inclined to one another, the cover being knitted by a method of knitting on a knitting machine having independently operable needles disposed in at least two needle beds; and wherein a single jersey edging is knitted along at least part of a length of, and integrally with, each of said edges, each of said edgings being knitted on from one to six needles in each course of knitting which forms said at least part of the length of each of said edges, and adjacent edges of said edgings are joined, during the knitting of the cover, to form the join between said areas of the cover.

* * * * *

UNITED STATES PATENT AND TRADEMARK OFFICE

CERTIFICATE OF CORRECTION

PATENT NO. : Re. 34,723
DATED : September 13, 1994
INVENTOR(S) : Robinson et al.

It is certified that error appears in the above-indentified patent and that said Letters Patent is hereby corrected as shown below:

| | | |
|---|---|---|
| Col. 1, | line 12, | capitalize the "T" in "this". |
| Col. 3, | line 36, | cancel "the" and substitute --their--. |
| Col. 3, | line 50, | cancel "and" and substitute --an--. |
| Col. 4, | line 26, | change "comprised" to --comprise--. |
| Col. 4, | line 68, | change "area" to --areas--. |
| Col. 5, | lines 42, 43 and 44, | delete the italics for the following: "is joined along its edge 16, as indicated by the chain lines 10a, to the edge 17 of the single jersey edging 14." |
| Col. 5, | line 62, | cancel "line" and substitute --lines--. |
| Col. 6, | line 27, | cancel "it" and substitute --It--. |

UNITED STATES PATENT AND TRADEMARK OFFICE

CERTIFICATE OF CORRECTION

PATENT NO. : Re. 34,723

DATED : September 13, 1994

INVENTOR(S) : Robinson et al.

It is certified that error appears in the above-indentified patent and that said Letters Patent is hereby corrected as shown below:

Col. 6, line 68, cancel "are" and substitute --area--.

Col. 7, line 46, cancel "st" and substitute --at--.

Signed and Sealed this

Eleventh Day of April, 1995

Bruce Lehman

*Attest:*

BRUCE LEHMAN

*Attesting Officer*

*Commissioner of Patents and Trademarks*